V. STARK.
POWER TRANSMITTER.
APPLICATION FILED APR. 24, 1920.
1,368,300.
Patented Feb. 15, 1921.
2 SHEETS—SHEET 1.
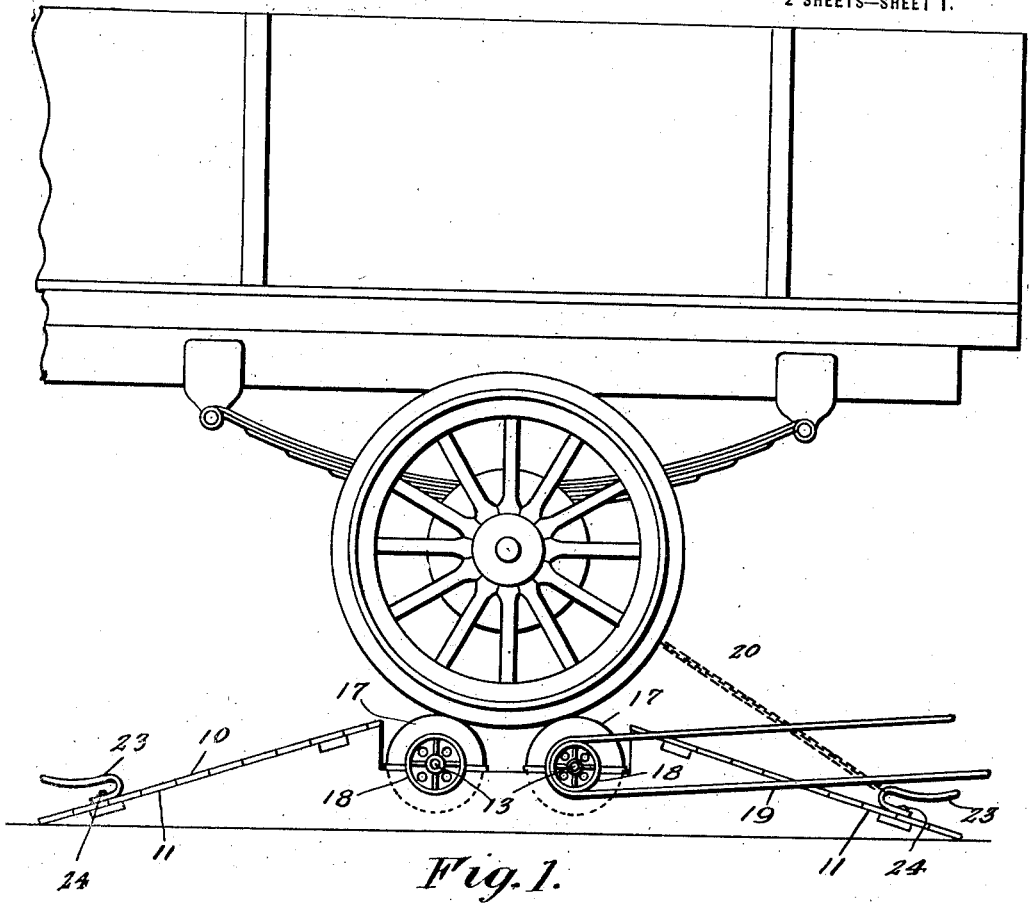
Fig. 1.
Fig. 2.
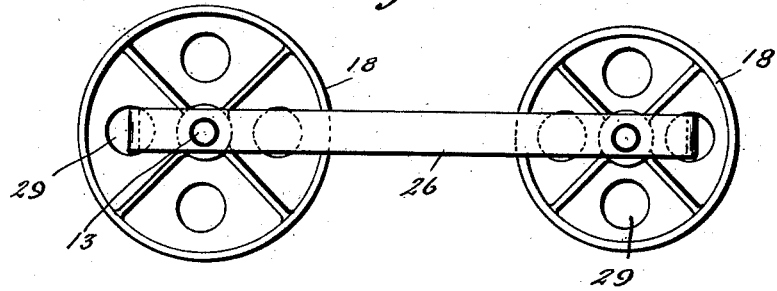
Vester Stark INVENTOR
BY *Victor J. Evans*
ATTORNEY
WITNESSES

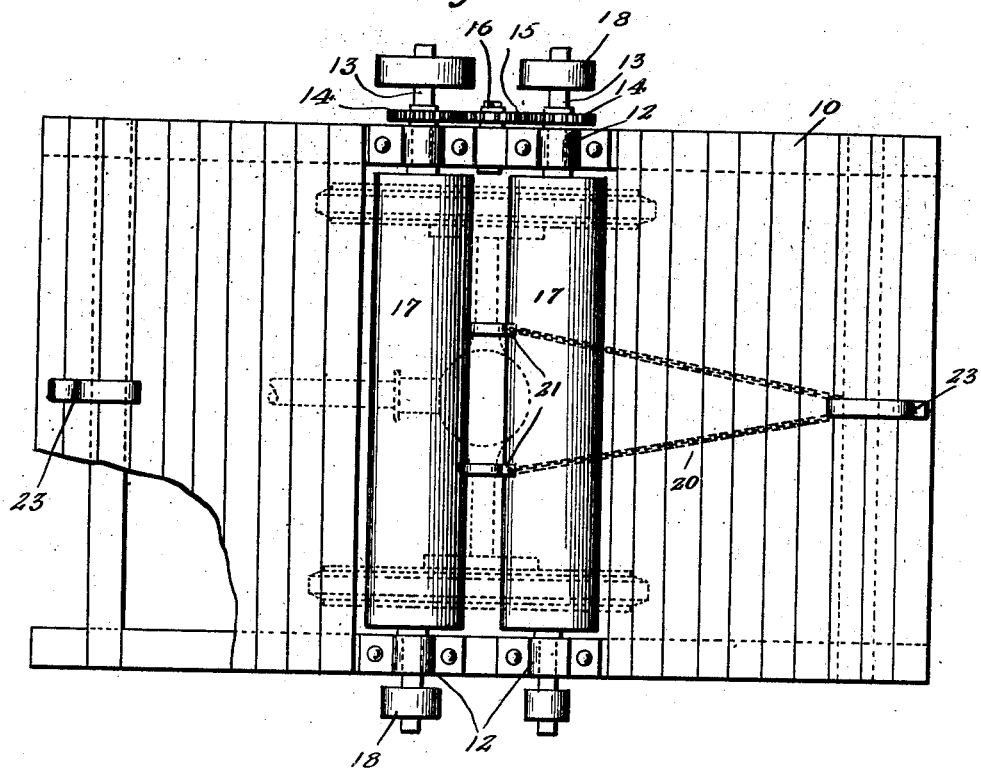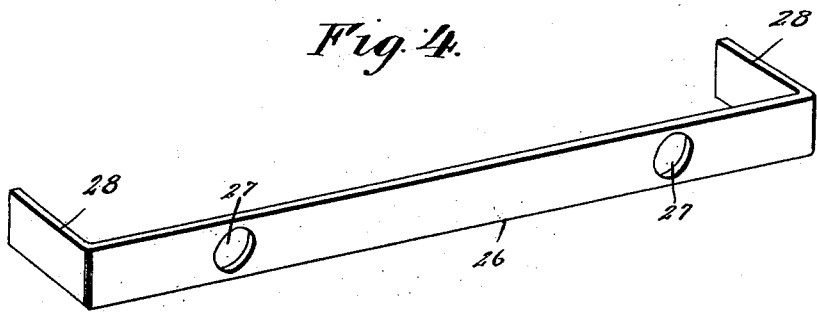

UNITED STATES PATENT OFFICE.

VESTER STARK, OF FAIRFIELD, IOWA.

POWER-TRANSMITTER.

1,368,300.      Specification of Letters Patent.      Patented Feb. 15, 1921.

Application filed April 24, 1920. Serial No. 376,346.

*To all whom it may concern:*

Be it known that I, VESTER STARK, a citizen of the United States, residing at Fairfield, in the county of Jefferson and State of Iowa, have invented new and useful Improvements in Power-Transmitters, of which the following is a specification.

This invention comprehends the provision of a power transmission apparatus, utilized in connection with a motor vehicle, in a manner whereby the power from the latter may be employed for driving machinery of different characters.

To this end, the invention makes use of a platform upon which is journaled parallel shafts, each supporting a roller which is actuated by the propelling wheels of the motor vehicle, the said shafts being geared together and equipped with belt pulleys or the like for transmitting the power from the shafts to the machinery to be actuated.

One of the objects of the invention resides in the provision of a novel construction of means whereby the shafts may be held against rotation, while the rear wheels of the motor vehicle are being brought to a position upon the rollers.

Another object of importance resides in the provision of means for readily and easily connecting the rear axle housing of the motor vehicle with the platform, in a manner to maintain the motor vehicle operatively positioned upon the rollers.

The nature and advantages of the invention will be better understood when the following detail description is taken in connection with the accompanying drawings, the invention residing in the construction, combination and arrangement of parts as claimed.

In the drawings forming part of this application, like numerals of reference indicate similar parts in the several views and wherein:—

Figure 1 is an enlarged side elevation of the invention showing a portion of a motor vehicle positioned thereon.

Fig. 2 is an enlarged view showing the manner of locking the shafts against rotation while the rear wheels of the motor vehicle are being positioned upon the device.

Fig. 3 is a top plan view of the apparatus.

Fig. 4 is a detail view of the locking elements.

Referring to the drawings in detail, 10 indicates generally a platform, which may vary in size, and which is tapered from spaced points in its length toward the opposite ends thereof, as at 11. The opposed sides of the platform provide bearings 12 for the spaced parallel shafts 13, each of these shafts being equipped with a gear 14 which meshes with an intermediate gear 15 journaled upon a stub shaft 16 projecting from one side of the platform between the shafts 13. The shafts 13 are thus connected for simultaneous rotation, and each shaft is equipped with a roller 17 upon which the propelling wheels of the motor vehicle are adapted to be arranged. The shafts 13 project beyond the opposite sides of the platform 10, and are equipped with belt pulleys 18. The pulleys may be of any suitable size, and may also vary in size relatively depending upon the particular machinery to be operated from the power transmitted from the shafts 13. In the use of the invention, the rear wheels of the motor vehicle, are positioned upon the rollers 17, and then rotated by means of the motor of the vehicle. As the wheels rotate, similar motion is imparted to the shafts 13, and consequently the power developed by the motor vehicle can be transmitted to the pulleys 18, and belt 19 in different directions and to different kinds of machinery. In order to maintain the wheels of the vehicle positioned upon the rollers 17, while the apparatus is in use, I make use of a substantially V-shaped chain 20, the terminals of which are suitably secured to the rear axle housing as at 21, while the intermediate portion of the chain is engaged by the hook 23 pivoted upon the platform as at 24, and when in active position holds the chain taut for the purpose specified.

In order to prevent rotation of the shafts 13, while the rear wheels of the motor vehicle are being brought into position upon the rollers 17, I make use of the rocking element shown in Fig. 4. This element is in the nature of an elongated bar 26, having openings 27 adjacent the opposite ends to receive the corresponding ends of the shafts 13. These openings of the locking element are indicated at 27. The opposite ends of the locking element are bent at right angles as at 28 to be received within openings 29 of the belt pulleys 18. By reason of this construction, it is obvious that the locking element can be readily and easily associated with the shafts 13 and belt pulleys 18 to prevent rotation of the shafts while the rear wheels of the vehicle are being positioned upon the rollers 17. Subsequent to the positioning of the wheels on the rollers, however, the locking element is removed and the apparatus put into operation.

While it is believed that from the foregoing description the nature and advantages of the invention will be readily apparent, I desire to have it understood that I do not limit myself in this connection and that such changes may be resorted to when desired as fall within the scope of what is claimed.

Having thus described my invention what I claim as new is:

1. An apparatus for transmitting power including a supporting structure, spaced parallel shafts journaled thereon, rollers carried by said shafts, said shafts projecting beyond the sides of the supporting structure, gear wheels fixed on each shaft, an intermediate gear journaled upon the supporting structure and meshing with the aforementioned gear, belt pulleys carried by said shafts, and a locking element having detachable engagement with said shafts, and certain of said pulleys to hold said shafts against rotation.

2. An apparatus for transmitting power including a supporting structure, spaced parallel shafts journaled thereon, a connection between said shafts whereby the latter are rotated in unison, a locking bar, belt pulleys carried by said shaft, and said bars being designed to be removably associated, and having its terminals engaging said belt pulleys, whereby said shafts are held against rotation.

In testimony whereof I affix my signature.

VESTER STARK.